(12) United States Patent
Kim

(10) Patent No.: US 8,654,075 B2
(45) Date of Patent: Feb. 18, 2014

(54) MOBILE TERMINAL

(75) Inventor: Chan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 13/283,995

(22) Filed: Oct. 28, 2011

(65) Prior Publication Data

US 2012/0133621 A1     May 31, 2012

(30) Foreign Application Priority Data

Nov. 25, 2010    (KR) .......................... 10-2010-0118088

(51) Int. Cl.
     *G06F 3/01*          (2006.01)

(52) U.S. Cl.
     USPC ........................................ 345/156; 345/157

(58) Field of Classification Search
None
See application file for complete search history.

(56) References Cited

U.S. PATENT DOCUMENTS

| 8,149,211 | B2 * | 4/2012 | Hayakawa et al. | ............ 345/156 |
| 8,373,703 | B2 * | 2/2013 | Beckwith et al. | ............. 345/467 |
| 2010/0011291 | A1 * | 1/2010 | Nurmi | ........................... 715/702 |

* cited by examiner

*Primary Examiner* — Joseph Haley

(74) *Attorney, Agent, or Firm* — Birch, Stewart, Kolasch & Birch, LLP

(57) ABSTRACT

A mobile terminal including a body having at least one partial region including a flexible material; a flexible display to display information; a sensor unit to detect a first physical bending of the flexible display; and a controller to display a prescribed mark to a specific region of the flexible display based on the detected bending of the flexible display.

18 Claims, 21 Drawing Sheets

(a)

(b)

MOBILE TERMINAL

Pursuant to 35 U.S.C. §119(a), this application claims the benefit of earlier filing date and right of priority to Korean Application No. 10-2010-0118088, filed on Nov. 25, 2010, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for generating various kinds of user input signals from physical variation of a flexible display.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. In addition, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which various kinds of user input signals can be generated from physical variation of a flexible display.

Another object of the present invention is to provide a mobile terminal, by which a pressure generated from bending a flexible display is detected and converted to a user input signal.

A further object of the present invention is to provide a mobile terminal, by which a position, direction and strength of bending a flexible display are detected and converted to a user input signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes a body having at least one partial region formed of a flexible material, a flexible display provided to the body to output a specific visual information, a sensor unit to detect a bending information on at least one of a bent position, a bent count, a bent direction and a bent strength of the flexible display, and a controller to output a prescribed mark to a specific region of the flexible display based on the bending information.

In another aspect of the present invention, a mobile terminal includes a body having at least one partial region formed of a flexible material, a flexible display provided to the body to output a specific visual information, a sensor unit to detect a bending information on at least one of a bent position, a bent count, a bent direction and a bent strength of the flexible display and a touch input to the flexible display, and a controller to output a prescribed mark to a specific region of the flexible display based on the bending information or the touch input.

Accordingly, the present invention provides the following effects and/or advantages.

First of all, various kinds of user input signals can be generated from physical variation of a flexible display.

Secondly, a pressure generated from bending a flexible display can be detected and converted to a user input signal.

Thirdly, a position, direction and strength of bending a flexible display can be detected and converted to a user input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
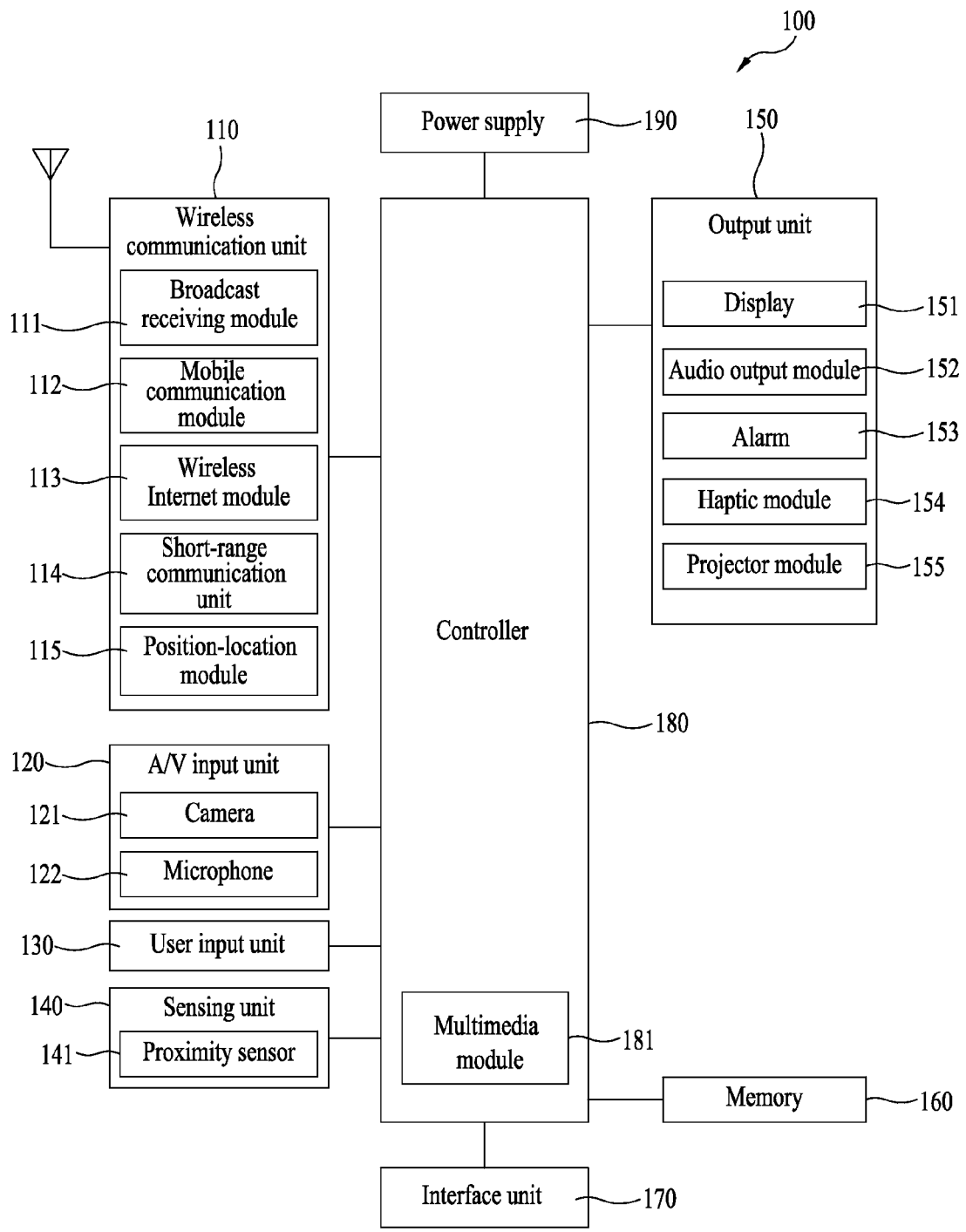
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. Regarding non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time information is calculated using three satellites, and errors of the calculated location and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example of the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor 141 detects an object approaching a prescribed detecting surface or a presence or non-presence of an object existing around itself using an electromagnetic power or infrared rays without mechanical contact. Hence, the proximity sensor is superior to a contact sensor in lifespan and utilization.

An example of an operational principle of the proximity sensor 141 is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch can detect the object to detect without interference with the material.

In spite of not providing the proximity sensor 141, if the touchscreen is electrostatic, it can be configured to detect the proximity of a pointer through an electric field change attributed to the proximity of the pointer.

So, when the pointer is placed in the vicinity of the touchscreen without being actually contacted with the touchscreen, it can detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. In addition, a position, at which the proximity touch is made to the touchscreen using the pointer, means a position of the pointer vertically corresponding to the touchscreen when the pointer makes the proximity touch.

If the proximity sensor is used, it can sense a proximity touch and its pattern (e.g., proximity touch distance, proximity touch direction, proximity touch speed, proximity touch position, proximity touch moving state, etc.). In addition, the proximity sensor 141 can output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, when data for various patterns of vibration and/or sound are output as the result of a touch input to the touchscreen, such data can be stored in the memory 160.

Because map information can be stored in the memory 160, the user's convenience is increased by providing the map information to the user if desired. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

A power supply 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some instances, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
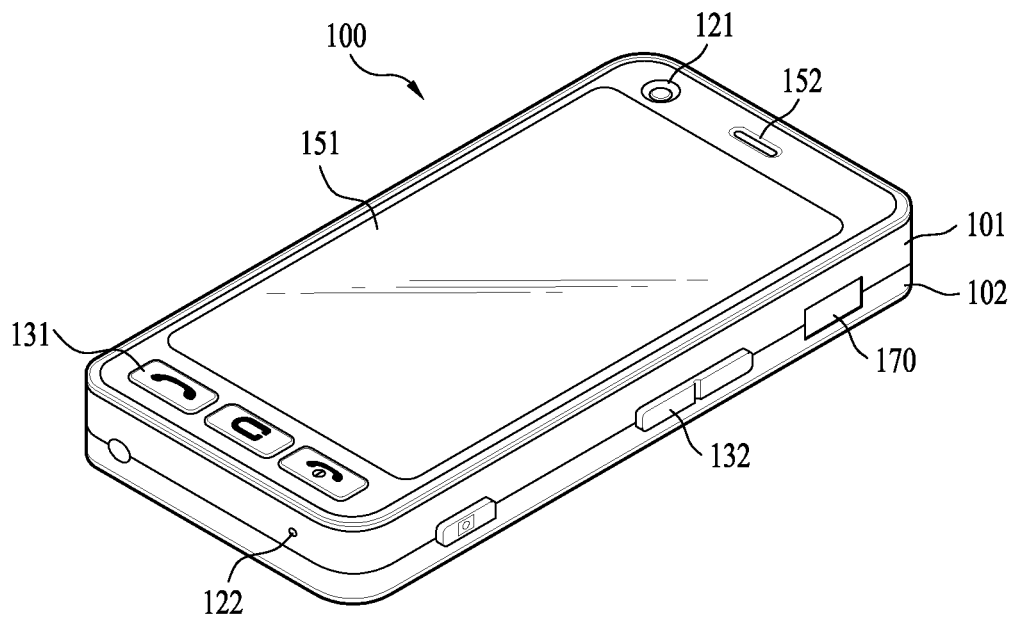
FIG. 2 is a front perspective diagram of a mobile terminal according to one embodiment of the present invention.

Next, FIG. 2 is a front perspective diagram for one example of a mobile terminal 100 according to one embodiment of the present invention.

The mobile terminal 100 shown in the drawing has a bar type terminal body. Yet, the mobile terminal 100 may be implemented in a variety of different configurations. Examples of such configurations include a folder type, a slide type, a rotational type, a swing type and combinations thereof. For clarity, further disclosure will primarily relate to a bar-type mobile terminal 100. However such teachings apply equally to other types of mobile terminals.

Referring to FIG. 2, a body of the mobile terminal 100 includes a case (e.g., a casing, a housing, a cover, etc.) configuring an exterior thereof. According to the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, a user input unit 130 (131/132), a microphone, an interface 170 and the like can be provided to the terminal body, and mainly, to the front case 101.

The display 151 occupies most of a main face of the front case 101. The audio output unit 151 and the camera 121 are provided to an area adjacent to one of both end portions of the display 151, while the first user input unit 131 and the microphone 122 are provided to another area adjacent to the other end portion of the display 151. The second user input unit 132, the interface 170 and the like can be provided to lateral sides of the front and rear cases 101 and 102.

The user input unit 130 is manipulated to receive an input of a command for controlling an operation of the terminal 100. In addition, the input unit 130 can include a plurality of manipulating units 131 and 132. The manipulating units 131 and 132 can be generally named a manipulating portion and may adopt any mechanism of a tactile manner that enables a user to perform a manipulating action by experiencing a tactile feeling. Contents input by the manipulating units 131 and 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 3:
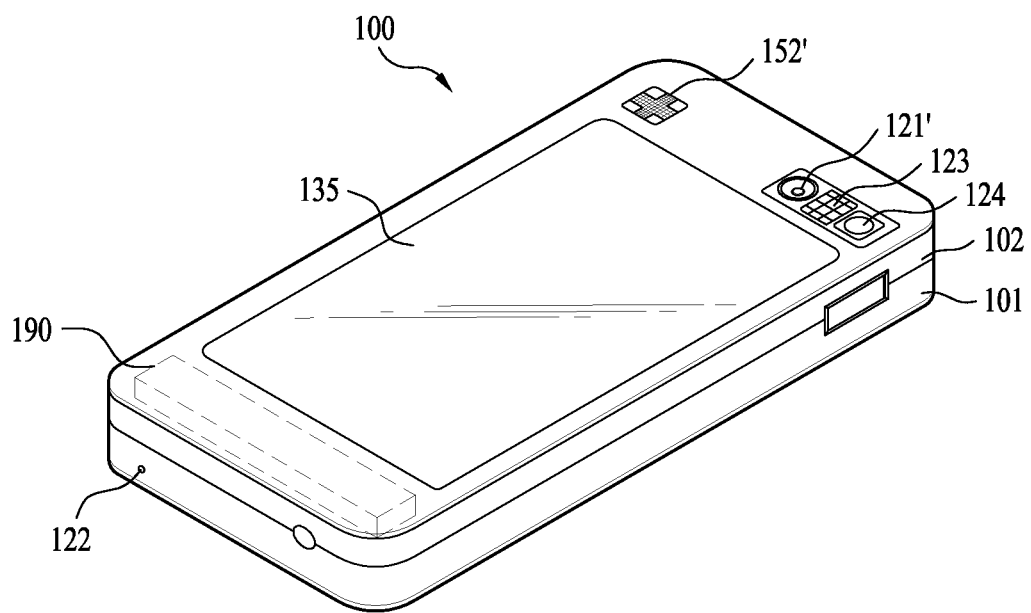
FIG. 3 is a rear perspective diagram of a mobile terminal according to one embodiment of the present invention.

FIG. 3 is a perspective diagram of a backside of the mobile terminal 100 shown in FIG. 2. Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the former camera 121.

Preferably, for instance, the former camera 121 has low pixels enough to take and transmit a picture of user's face for a video call, while the latter camera 121' has high pixels for capturing a general subject for photography without transmitting the captured subject.

Further, each of the cameras 121 and 121' can be installed at the terminal body to be rotatable or popped up.

A flash 123 and a mirror 124 can be additionally provided adjacent to the camera 121'. The flash 123 projects light toward a subject when photographing the subject using the camera 121'. When a user attempts to take a picture of the user (self-photographing) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the mobile terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmitting type like the display 151. In this instance, if the display 151 is configured to output visual information from its both faces, it can recognize the visual information via the touchpad 135 as well. The information output from both of the faces can be entirely controlled by the touchpad 135. Alternatively, another display is further provided to the touchpad 135 so that a touchscreen can be provided to the rear case 102 as well.

The touchpad 135 is activated by interconnecting with the display 151 of the front case 101. The touchpad 135 can be provided in front or rear of the display 151 in parallel. The touchpad 135 can have a size equal to or smaller than that of the display 151.

Figure 4:
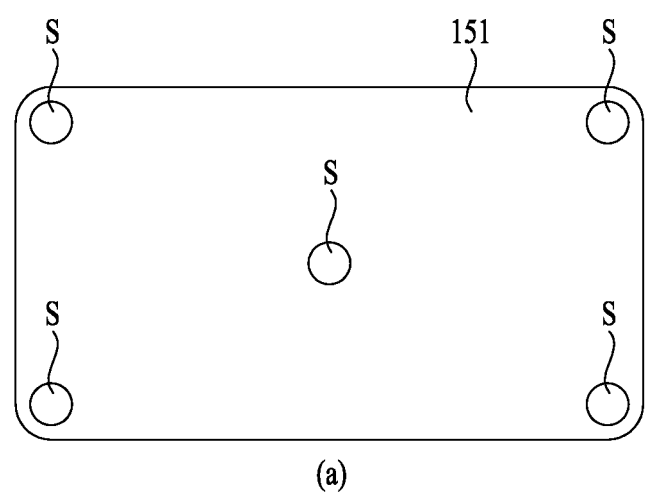
FIG. 4 is a conceptional diagram of components of a mobile terminal according to one embodiment of the present invention.
Figure 4:
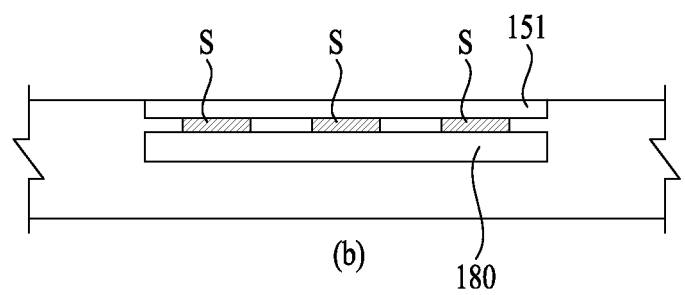
Figure 5:
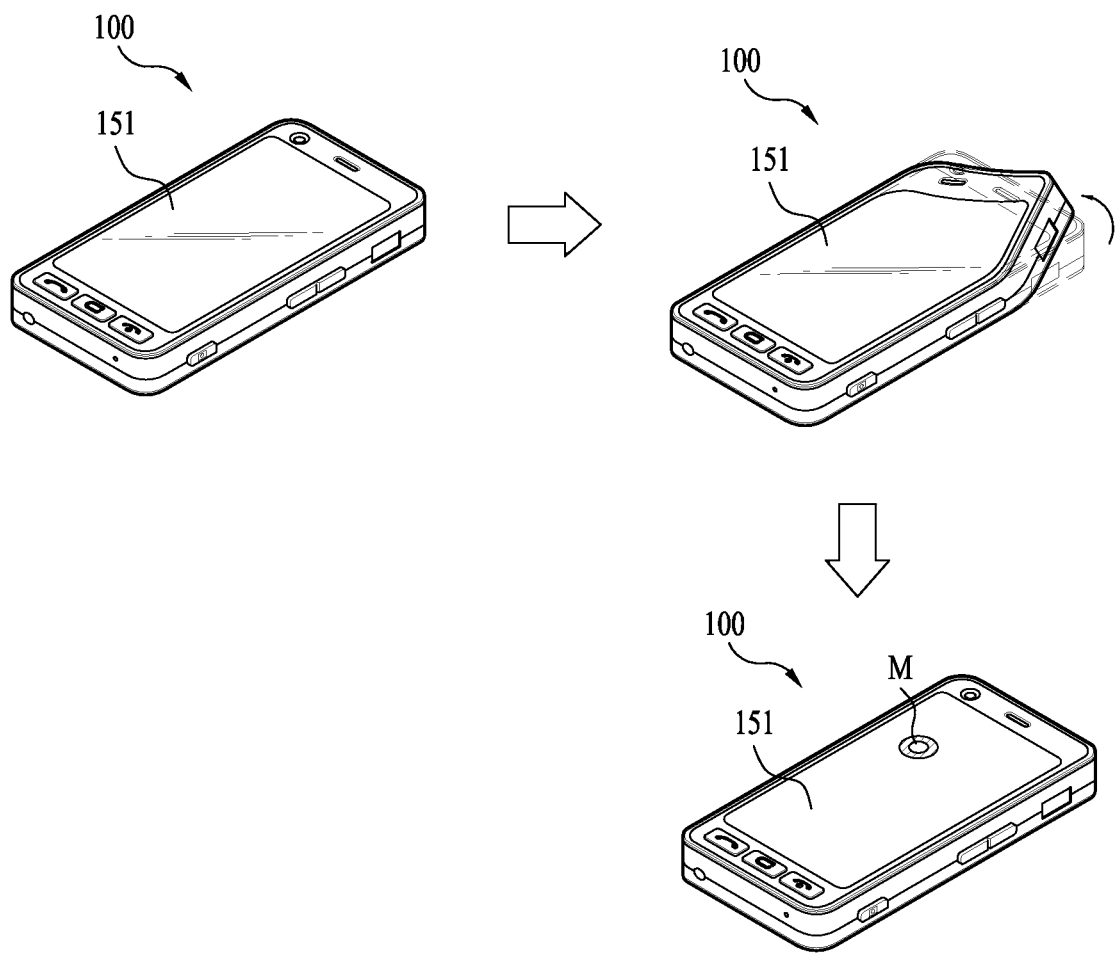
FIGS. 5 and 6 are perspective diagrams for explaining one operating state of a mobile terminal according to one embodiment of the present invention.
Figure 6:
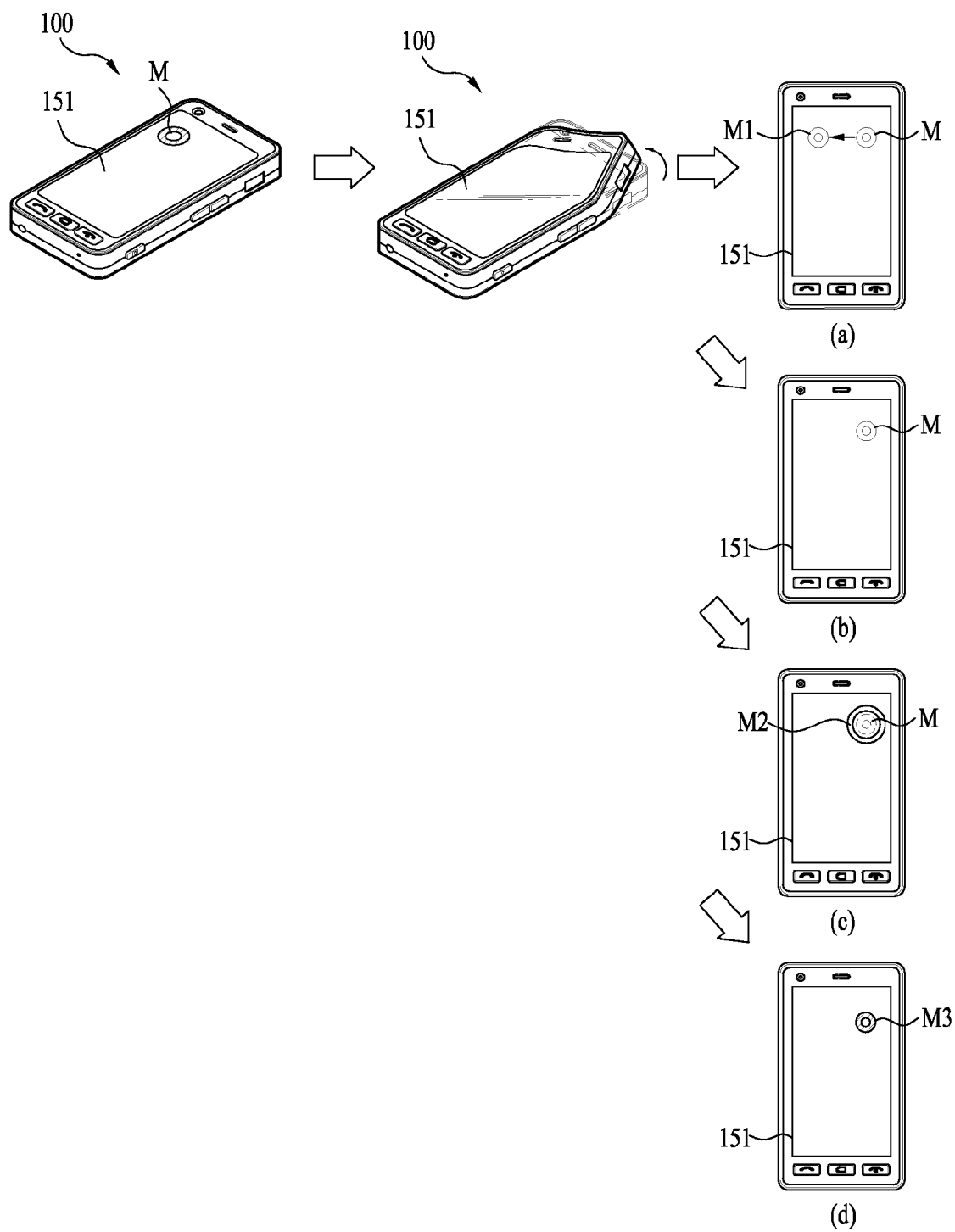
Figure 7:
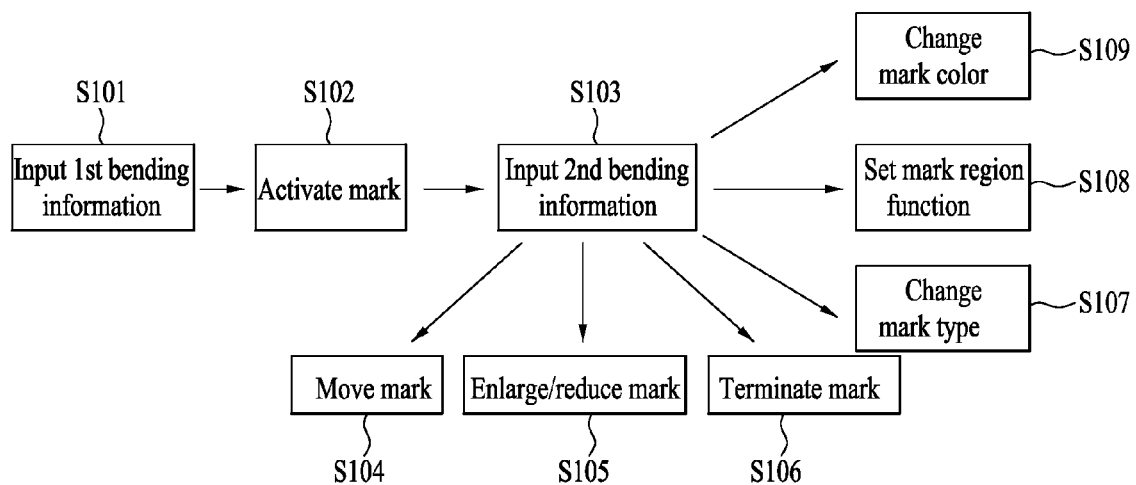
FIGS. 7 to 9 are block diagrams for explaining one operating state of a mobile terminal according to one embodiment of the present invention.
Figure 8:
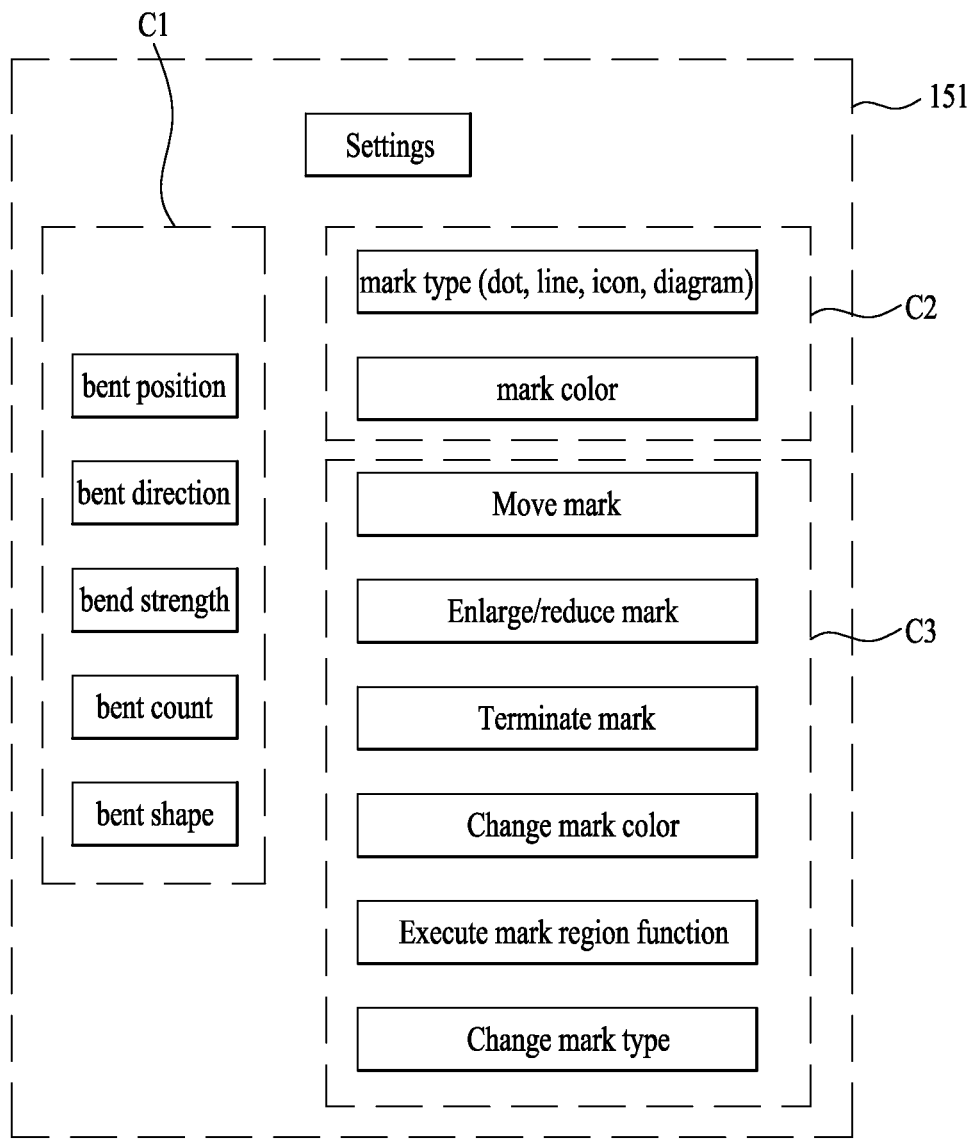
Figure 9:
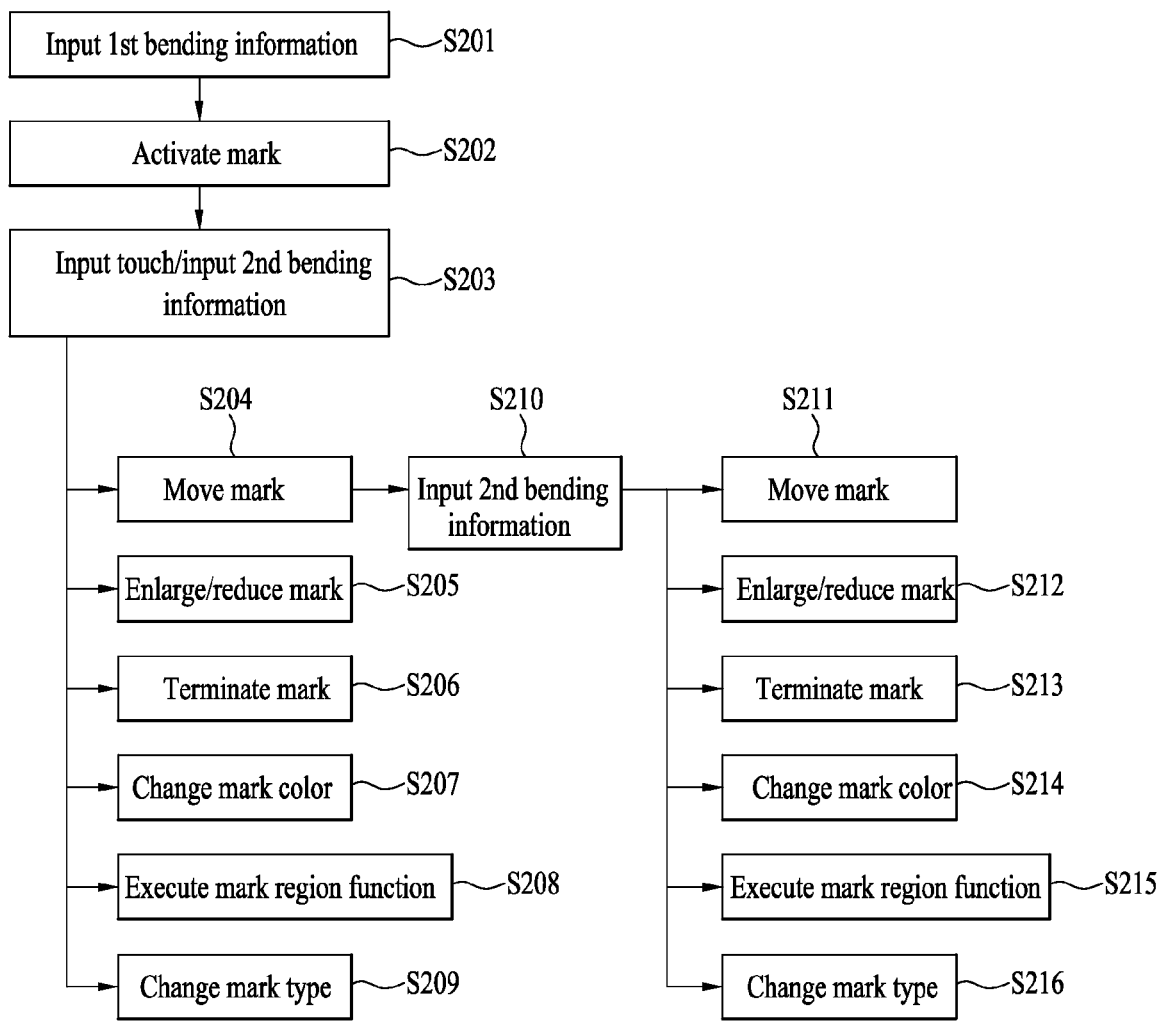

Next, FIG. 4 is a conceptual diagram of components of a mobile terminal according to one embodiment of the present invention. FIGS. 5 and 6 are perspective diagrams for explaining one operating state of a mobile terminal according to one embodiment of the present invention. FIGS. 7 to 9 are block diagrams for explaining one operating state of a mobile terminal according to one embodiment of the present invention.

A mobile terminal 100 according to an embodiment of the present invention includes a body having at least one partial region formed of a flexible material, a flexible display 151 provided to the body to output a specific visual information, the flexible display 151 configured to be bent by an elastic variation of the body, a sensor unit S configured to detect a bending information on at least one of a bent position, a bent count, a bent direction and a bent strength of the flexible display 151, and the controller 180 configured to output a prescribed mark M to a specific region of the flexible display 151 based on the bending information in a manner that the specific region is distinguished from the rest region of the flexible display 151.

In this instance, the mark M can include at least one of a dot, a line, a graphic, a symbol and an icon based on the bending information.

Further, the bent position in the bending information is explained for example with reference to FIG. 5 as follows. First of all, when a user bends a right top side of the mobile terminal 100, the controller 180 can output such a mark as a dot, an icon and the like to a specific region on the flexible display 151. Moreover, when a user bends a left top side of the mobile terminal 100, the controller 180 can output such a mark as a line, a symbol and the like to a specific region on the flexible display 151.

In particular, a type of the mark based on the bending information can vary in accordance with at least one of a bent position, a bent count, a bent direction and a bent strength. Also, such a corresponding relation can be freely set up by a user.

If the bending information is changed, e.g., if a bent position, a bent strength or a bent direction is changed, the controller 180 can change at least one of a position, a size, a shape and a color of the mark M displayed on the flexible display 151.

If the bending information is changed, e.g., if a bent position, a bent strength or a bent direction is changed, the controller 180 can display visual information of an area overlapping with the mark M displayed on the flexible display 151 or can zoom in or out the visual information.

According to one embodiment, if a bent position is abruptly changed, a new mark can be output to the corresponding position or a position of a previously displayed mark can be moved. Further, if a bent strength is changed (e.g., if a strength is increased), a size of the mark is increased, a shape of the mark is changed or a color can be thickened. If a bent direction is changed, a position of the mark can be changed.

According to another embodiment, the controller 180 allows a user to visually recognize a change of the bending information through one of a position, size, shape and color of the mark or a combination thereof. Meanwhile, the visual information can include at least one of a document, a book, a photo, a map and a video.

Referring next to FIGS. 6 and 7, if a first bending information is input (S101), a mark M corresponding to the first bending information is activated on the flexible display 151 (S102). Thereafter, if a second bending information is input (S103), the controller 180 moves a position of the mark M (M→M1) as shown in FIG. 6(a) (S104). Alternatively, the controller 180 can terminate the mark M as shown in FIG. 6(b) (S106), enlarge (M2) or reduce the mark M as shown in FIG. 6(c) (S105), or change a color (M→M3) of the mark M as shown in FIG. 6(d) (S107). Alternatively, the controller 180 can display visual information (e.g., a menu screen) overlapping with the mark M (S108).

On the other hand, as soon as the bending information is detected, the controller 180 can output the mark to a specific region of the flexible display. Alternatively, the controller 180 can preferentially output a check menu or the like to enable a user to determine whether to output the corresponding mark.

Further, the controller 180 controls the mark to be output for a prescribed duration only. If the prescribed duration elapses, the controller 180 terminates the mark. Meanwhile, a type and change of the mark based on the bending information can be set up by a user in accordance with various kind of bending information.

Referring to FIG. 8, on a user setting screen displayed on the flexible display 151, a user can match a bending information C1 containing a bent position, a bent direction, a bent strength, a bent count and a bent shape to a mark information C2 containing a mark type (e.g., a dot, a line, an icon, a diagram, etc.) in accordance with each bending information C1, a mark color and the like, if desired.

In association with a change of the bending information C1, the user can also match a change information C3 containing a mark shift, a mark enlargement/reduction, a mark termination, a mark color change, a mark region function execution and a mark type change if desired.

Further, a mark shift, a mark enlargement/reduction, a mark termination, a mark color change, a mark region function execution and a mark type change can be performed by a user's touch input to the flexible display 151 as well as the bending information. In this instance, the flexible display 151 can include a touchscreen capable of recognizing a user's touch.

In the following description, one operating scenario of a bending information input to the mobile terminal 100 and a touch input to the flexible display 151 is explained with reference to the accompanying drawings.

Referring to FIG. 9, a first bending information is input (S201) and a prescribed mark can be then activated (S202). Thereafter, if a second bending information is input or a touch input is performed (S203), the activated mark is shifted (S204), enlarged/reduced (S205), or terminated (S206). Alternatively, a color of the mark is changed (S207), visual information in a corresponding region is displayed (S208), or a type of the mark is changed (S209). For instance, after the mark has been shifted according to the second bending information or the touch input (S204), if a third bending information is input or a touch input is performed (S210), the shifted mark is shifted again to another position (S211), enlarged/reduced (S212), or terminated (S213). Alternatively, a color of the mark is changed (S214), visual information is displayed in a corresponding region (S215), or a type of the mark is changed (S216).

Meanwhile, in association with a display scheme of the mark M, the controller 180 can overlay the mark M on a specific region by making a color of the mark M transparent to enable a user to check the visual information displayed on the specific region. Alternatively, the controller 180 can display the mark M on a region out of the specific region by connecting the mark M with an indication line, a connecting line and the like.

In the following description, a sensor unit S configured to recognizing a bending of a mobile terminal is explained in detail with reference to the accompanying drawings.

Referring to FIG. 4, the sensor unit S can include a plurality of pressure sensors arranged on a backside of a flexible display in a length or width direction of the flexible display by being spaced apart from each other.

The sensor unit S can be arranged in a length direction and/or a width direction of the flexible display 151 by being spaced apart from each other with a prescribed space in-between. Each sensor unit S detects a pressure change, strength size, direction, etc. at each position of the flexible display 151 and then delivers the detection as an electric signal to the controller 180. Subsequently, the controller 180 generates a user input signal in accordance with at least one of a bent position, a bent direction and a bent strength of the flexible display 151.

The sensor unit S can include a motion sensor, a tension sensor, an inclination sensor, a pressure sensor, an acceleration sensor and the like. In particular, the pressure sensor detects whether a pressure is applied to the flexible display 151 and can detect a size of the pressure and the like. The pressure sensor can be installed at a portion of the mobile terminal 100, at which the pressure detection is used, in accordance with a use environment.

Further, the acceleration sensor is a device configured to convert an acceleration change in a prescribed direction to an electric signal and is used in MEMS (micro-electromechanical systems). The acceleration sensor can include one of a variety of types as follows. First of all, the acceleration sensor includes a sensor built in a car airbag system to measure acceleration having a large value used in detecting a collision. Secondly, the acceleration sensor includes a sensor configured to measure an acceleration having a fine value to be used as an input method of a game and the like for recognizing a fine action of a user's hand. The acceleration sensor is configured by loading 2 or 3 axes in one package and may include a z-axis only in accordance with environment of use.

Therefore, when an acceleration sensor in an X- or Y-axis direction is used instead of a Z-axis direction, the acceleration sensor can be set to stand up on a main board using a separate piece of board.

Moreover, the controller 180 can determine a bent position and direction by compensating for a size of the pressure detected by each pressure sensor.

Figure 10:
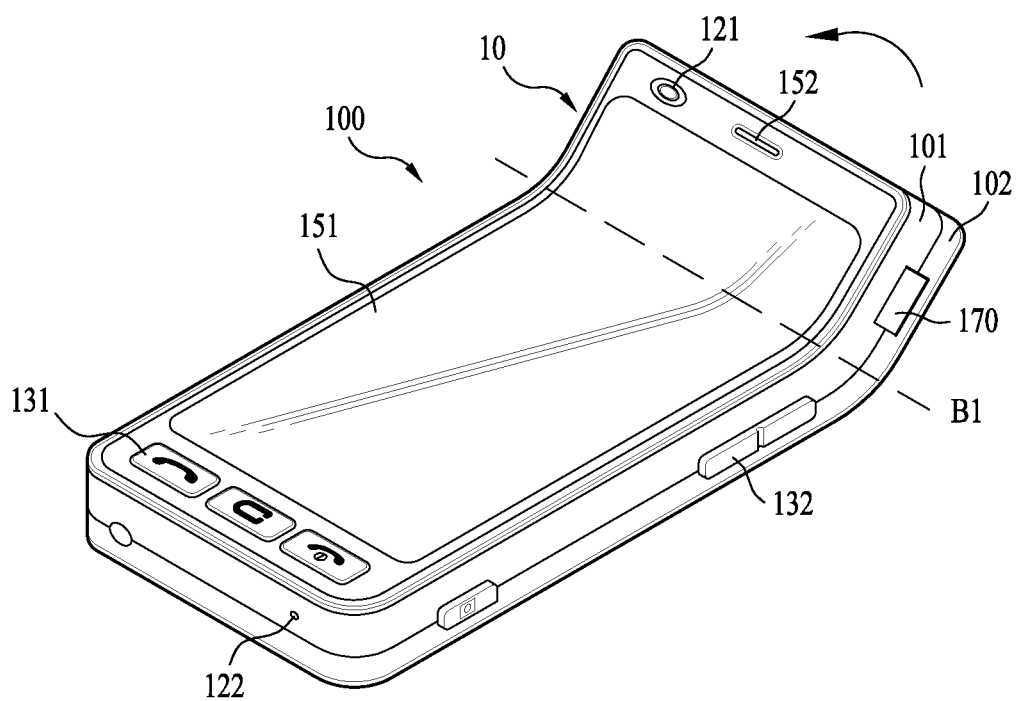
FIGS. 10 to 22 are diagrams for explaining various operating states of a mobile terminal according to one embodiment of the present invention.

In the following description and as shown in FIG. 10, how a body 10 formed of a flexible material included in at least one partial region to allow the above-mentioned bending is explained in detail as follows.

First of all, the body 10 includes the cases 101 and 102, the controller 180 and at least one component for executing a specific function. In addition, at least one partial region of the body 10 is formed of an elastically-variable material.

According to the present embodiment, the body 10 substantially includes a frame and the like provided within the cases 101 and 102 but is not clearly distinguished from the cases 101 and 102. Namely, the body 10 can be described by constituting an overall skeleton of the mobile terminal 100 by including the cases 101 and 102, the frame configuring internal shape of the cases and the like.

The body 10 is configured to be bendable. If at least one portion of the body 10 is externally exposed by being formed of an elastically variable material or separate cases 101 and 102 are provided according to a design condition, the cases 101 and 102 are formed of the elastically variable material like the body 10 to enable physical variation of an exterior of the mobile terminal 100.

Within the body 10 of the mobile terminal 100, a normal printed circuit board and a flexible printed circuit board formed of a flexible material can be selectively provided. In particular, the flexible printed circuit board can be provided to a portion of the body 10 formed of a flexible material and the normal printed circuit board can be provided to a portion of the body 10 formed of a solid material.

The printed circuit board configuring the controller 180 includes a board, on which thin and narrow Cu-wire is printed, and corresponds to an electric/electronic part playing a role in connecting parts by enabling various parts such as semiconductors, condensers, resistors and the like to be fitted thereto. The printed circuit board enables an efficient design of electrical wires, thereby reducing a size of an electronic device and raising performance thereof. The normal printed circuit board includes a solid board having a predetermined rigidity. Yet, the flexible printed circuit board enables electronic circuit mounted thereon by attaching electronic devices attached to a plastic-like bendable substrate, thereby being suitable for a structure that enables physical variation.

The above-mentioned display includes the flexible display 151 capable of coping with a bending of the body 10. The flexible display 151 literally means a flexible screen which can be bent or rolled up. Also, the flexible display 151 is configured to have flexibility for folding and unfolding. The above-described flexible display 151 can be provided within the body 10 to be bendable in accordance with an elastic variation of the body 10.

Thus, if the body 10 and the flexible display 151 are physically variable, and if the sensor unit S is capable of detecting a physical change of the flexible display 151, the sensor unit S can intuitively deliver a user input signal without using a keypad.

Moreover, a compressive force and a tensile force, which are generated from the bending of the body 10 and the flexible display 151, are detected as a user input signal or a relative position change of a plurality of the sensor units S, which is generated from the bending of the flexible display 151, can be detected as a user input signal. Therefore, when a game or user interface oriented menu is used, the corresponding utilization can be maximized and a user can become more interested. Thus, if a physical variation of the flexible display 151 is recognized as a user input signal, it can control operations of the mobile terminal 100 in various ways.

FIGS. 10 to 22 are diagrams for explaining various operating states of a mobile terminal according to one embodiment of the present invention.

Referring to FIG. 10, the controller 180 determines a curved portion attributed to a bending of the flexible display 151 through a pressure detected by each pressure sensor and can then output a reference line B1 passing through the curved portion.

A process for the controller 180 to output the reference line is described in detail as follows. First of all, according to one embodiment, as mentioned in the foregoing description, the sensor unit can include a plurality of pressure sensors arranged in a length or width direction of the flexible display on a backside of the flexible display by being spaced apart from each other.

The controller 180 recognizes a pressure distribution according to the length or width direction of the flexible display 151 through the pressures detected by the pressure sensors, determines a curved portion due to a bending of the flexible display 151 by compensating for the pressure distribution, and then outputs a reference line passing through the curved portion.

In doing so, the controller 180 calculates a pressure error within a predetermined range for generating a straight line based on each coordinates position on the flexible display 151, excludes data output of the error range, and outputs a straight line form (i.e., a reference line) to the curved portion of the flexible display 151 by connecting points having the pressure distribution within the predetermined range together.

Figure 11:
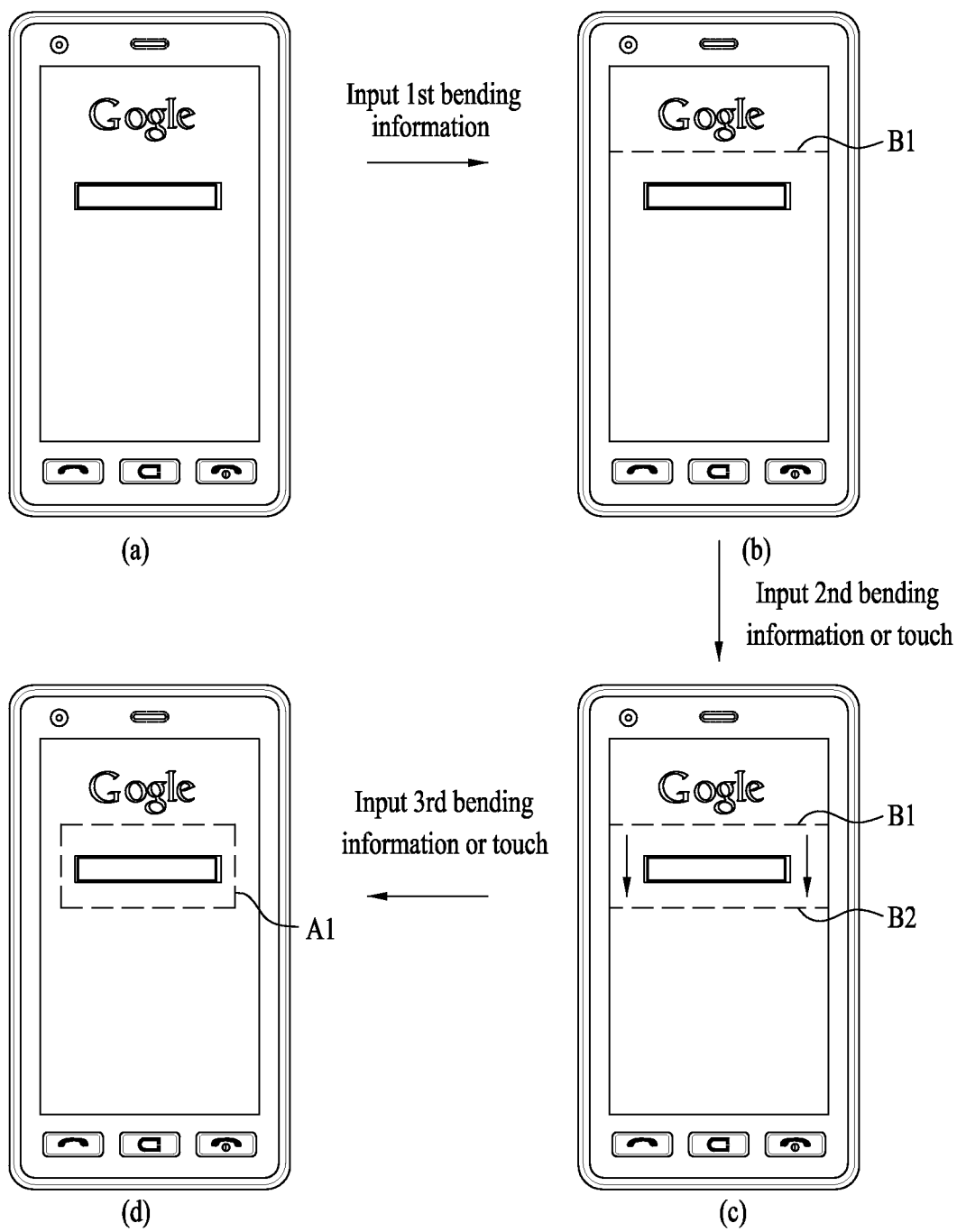
Figure 12:
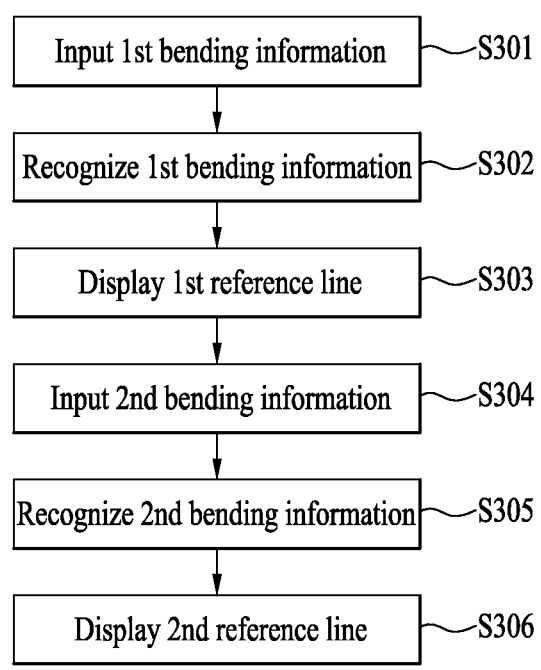

Referring to FIGS. 11 and 12, while visual information is displayed on the flexible display 151, and if a first bending information of the flexible display 151 is input (S301), the controller 180 recognizes the first bending information (S302).

In particular, as mentioned in the foregoing description, the first bending information can include a bent position, a bend direction, a bent strength, a bent count and the like. According to one embodiment, the controller 180 outputs a first reference line B1, which passes through a first curved portion due to a first bending, to the visual information (S303).

When a second bending information is input in a prescribed direction or with a prescribed strength against the first bending of the flexible display 151 (S304), the controller 180 recognizes the second bending information (S305) and outputs a second reference line B2, which passes through a second curved portion due to a second bending, to the visual information for example (S306).

If a third bending information is input or there is a user's touch input, the controller 180 activates visual information A1 between the first reference line B1 and the second reference line B2 according to the first bending and the second bending of the flexible display 151.

Besides, the controller 180 can enlarge or reduce the visual information A1 between the first reference line B1 and the second reference line B2, which are output by the first bending and the second bending of the flexible display 151, respectively, and outputs the visual information A1 to a separate window only.

For instance, if the visual information A1 between the first reference line B1 and the second reference line B2 is a search window, the controller 180 activates the search window and outputs a keypad for an input to the flexible display 151.

A user selects a desired activated visual information A1 and then pastes it in an appropriate place. Alternatively, the user cuts off the selected visual information. Alternatively, the user can transmit the activated visual information A1 to another medium via mail or the like.

Alternatively, after the first reference line B1 has been output, if a bending information is changed or a touch input is recognized, the controller 180 changes at least one of a position, thickness, shape and color of the first reference line B1.

Figure 13:
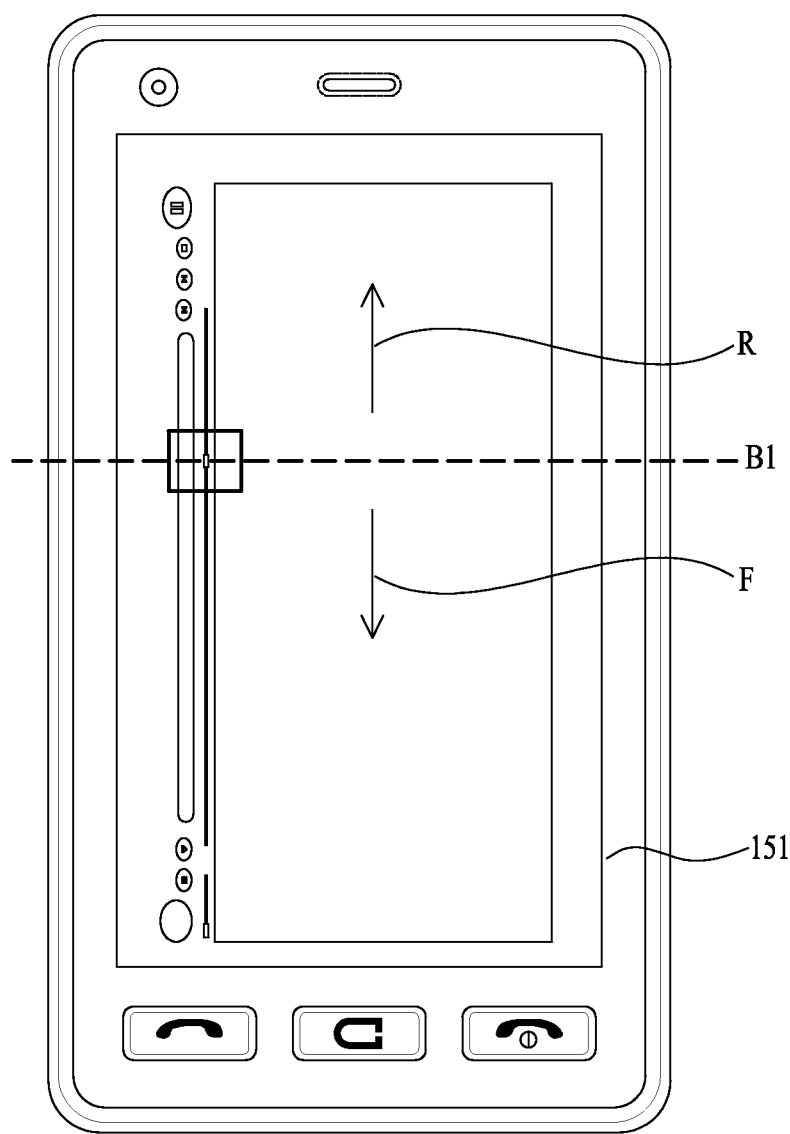

Referring to FIG. 13, if a first bending information is input, the controller 180 can output a first reference line B1 due to a first bending. If a second bending is generated in a prescribed direction or with a prescribed strength against the first bending, the controller 180 can perform a scrolling operation (R, F) on visual information in accordance with the bend direction or strength.

For instance, while music or video is played, a user can select specific music or video via a scroll operation attributed to the above-mentioned bending or adjust a play speed, a play position and the like.

Alternatively, instead of using the second bending information, the controller 180 can scroll visual information using a touch input to each region partitioned with reference to the first reference line B1 while the first reference line B1 is output.

When such visual information as a newspaper, a document, a book and the like is displayed on the flexible display 151, and if a first bending of the flexible display 151 is input in a direction inclining at a prescribed angle against a length or width direction of the flexible display 151, the controller 180 can scroll the visual information to a next page in accordance with a specific direction. Alternatively, if a corner of a right top side of the flexible display 151 is bent, the visual information can be scrolled to a previous page.

Figure 14:
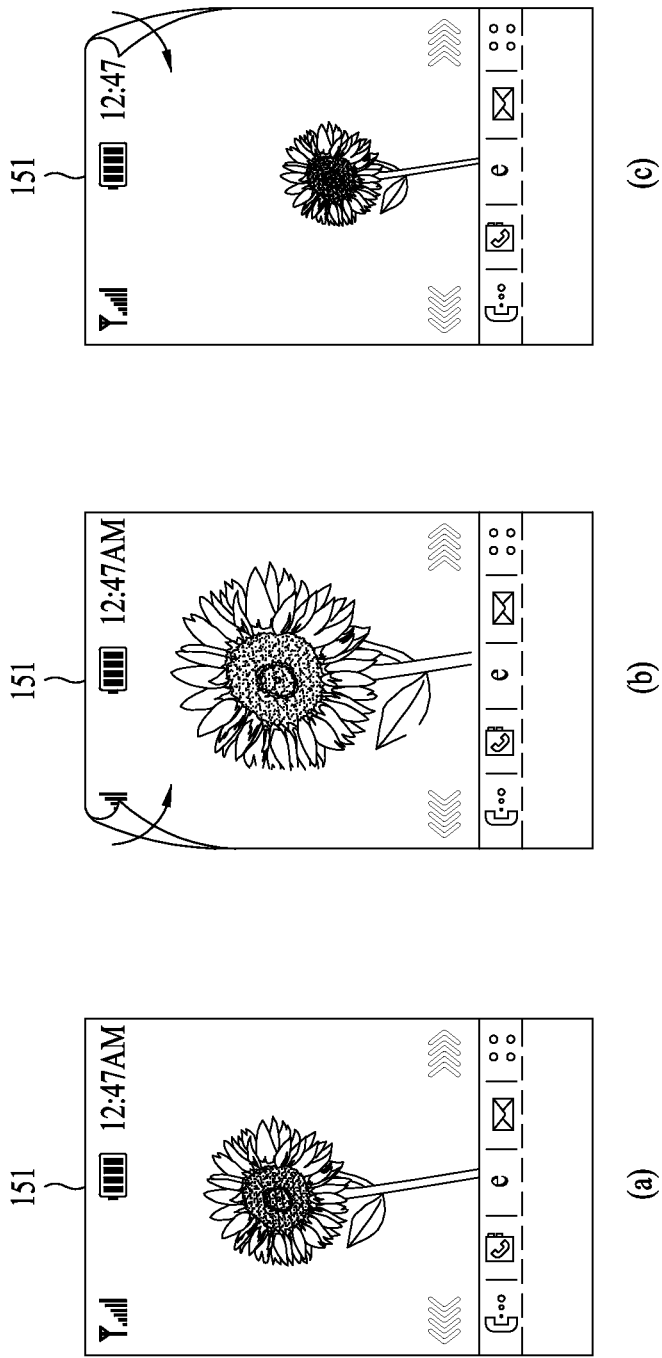

Alternatively, referring to FIG. 14, visual information displayed on the flexible display can be enlarged or reduced using a bending of the mobile terminal 100.

For instance, referring to FIG. 14(b), when a user bends a left top side of the flexible display 151, the controller 180 can enlarge visual information. When a user bends a right top side of the flexible display 151, the controller 180 can reduce visual information.

Figure 15:
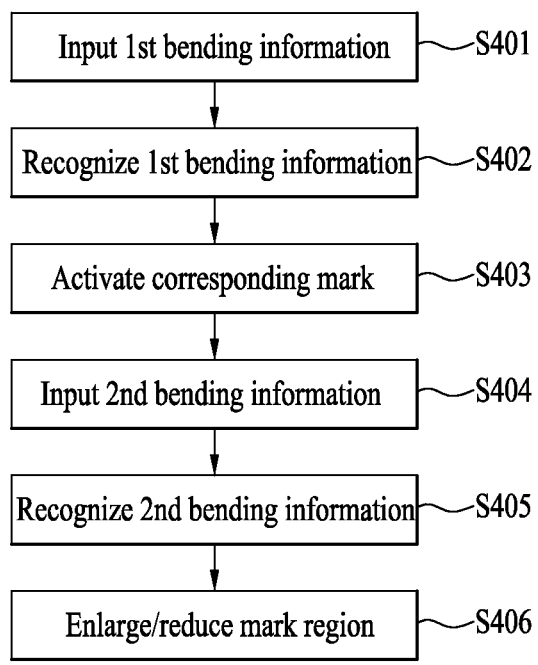

Alternatively, referring to FIG. 15, when a first bending information is input (S401), the controller 180 recognizes the first bending information (S402) and activates a corresponding mark on the flexible display 151 (S403). Thereafter, if a second bending information is input (S404), the controller 180 recognizes the second bending information (S405) and enlarges or reduces visual information displayed on a region overlapping with the mark.

Moreover, when the visual information is enlarged or reduced, the controller 180 can enlarge or reduce whole visual information centering on the visual information displayed on the region overlapping with the mark.

Meanwhile, when a user's touch is input instead of the second bending information, the controller 180 can enlarge or reduce visual information displayed on a region overlapping with the mark.

Figure 16:
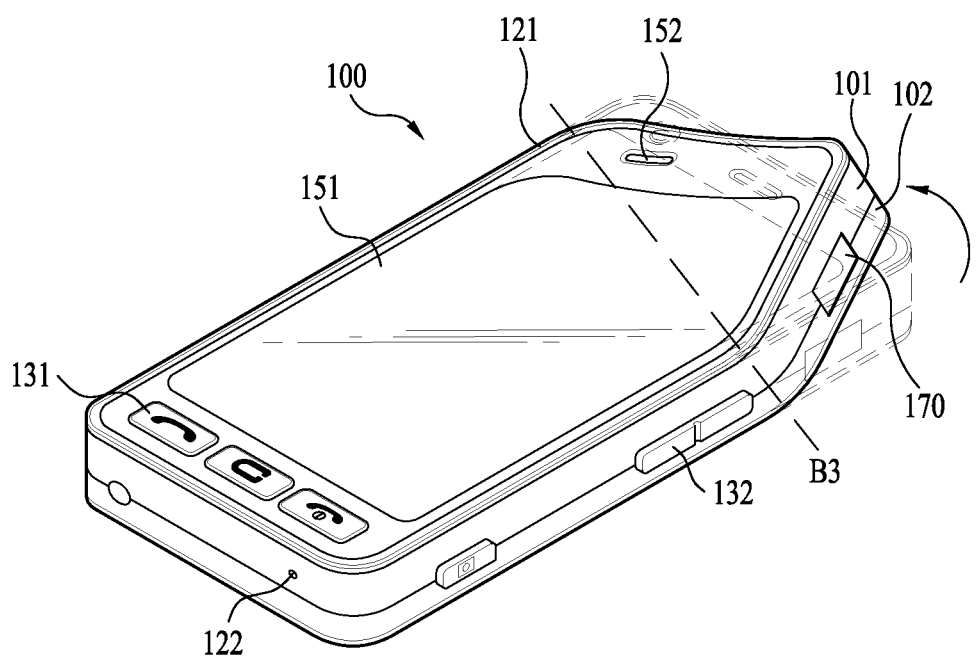

FIG. 16 illustrates an edge or corner of the mobile terminal 100 being bent upwards along a reference line B3 being generated.

Figure 17:
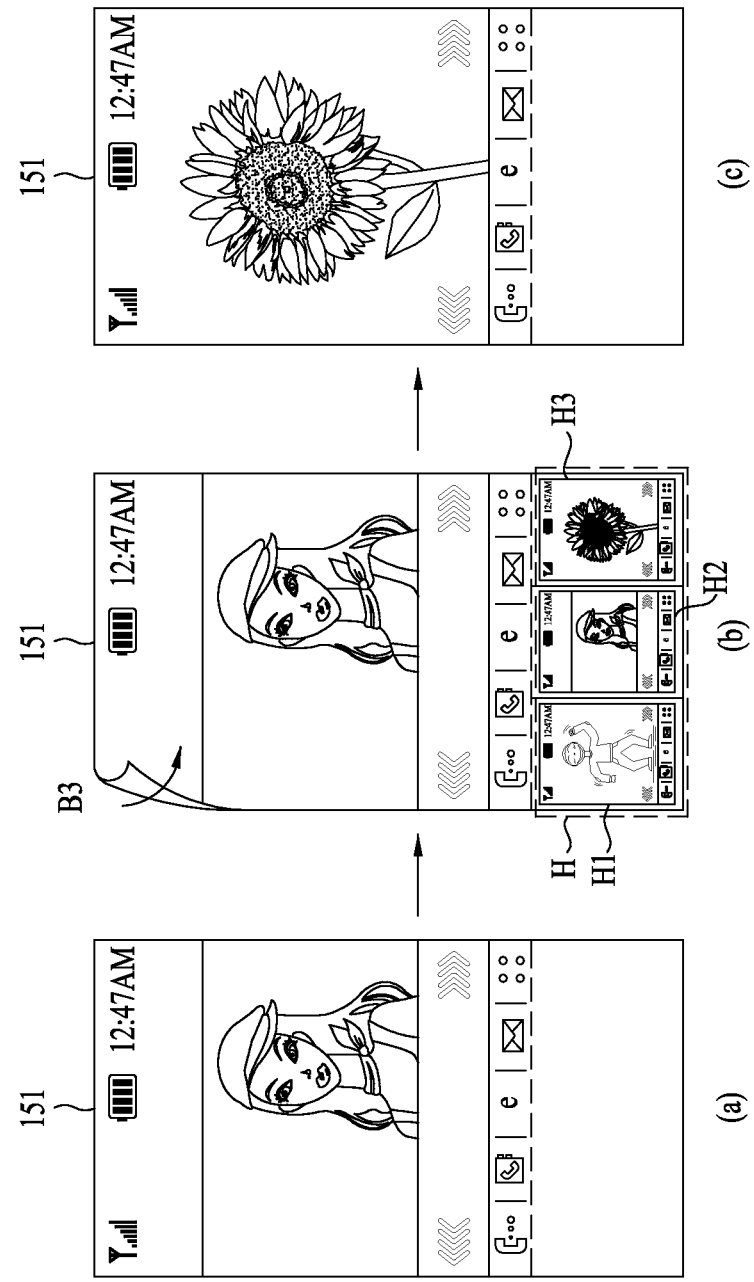
Figure 18:
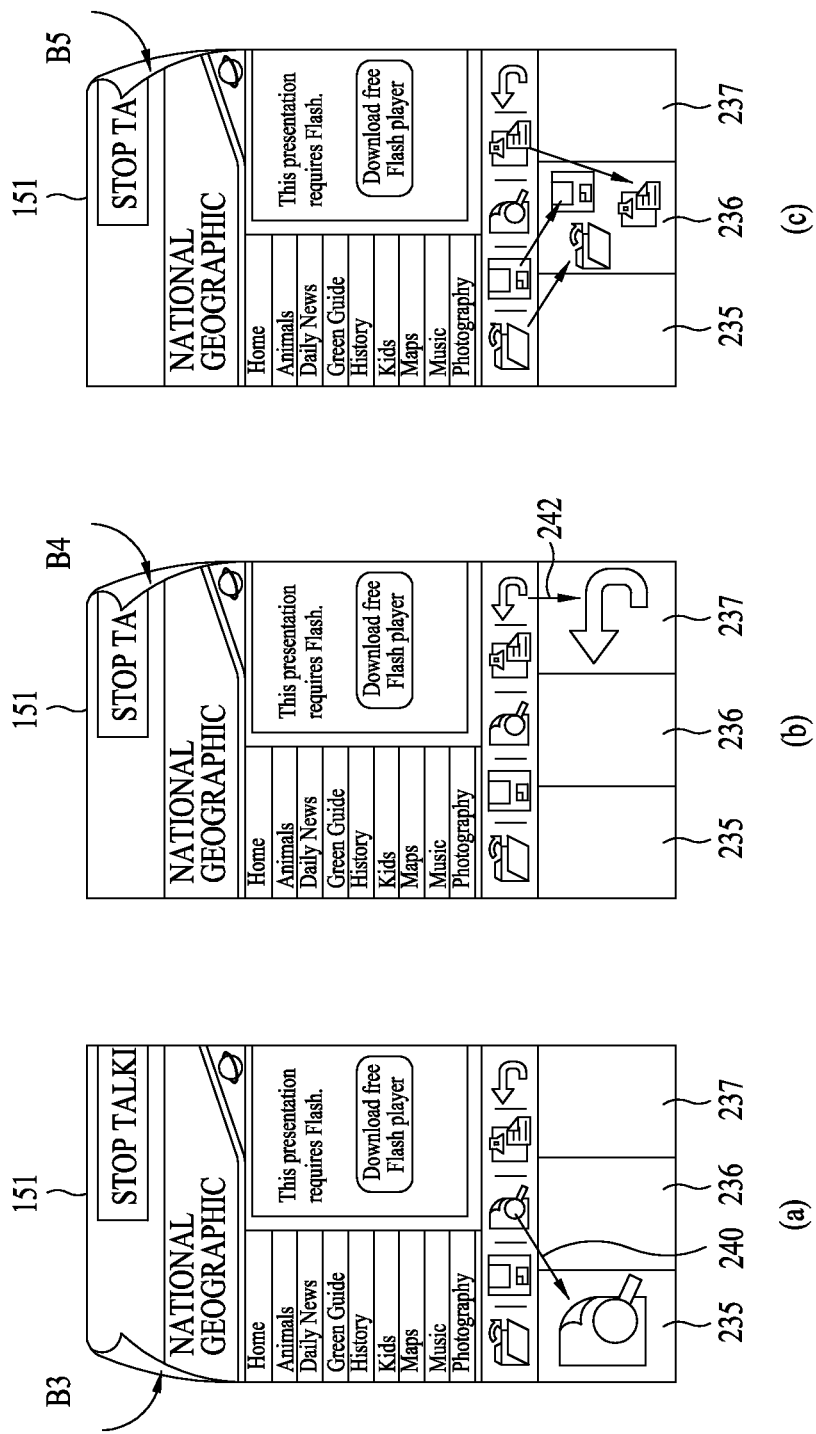

Meanwhile, referring to FIG. 17, a photo folder H saved in the mobile terminal 100 and a plurality of photos H1 to H3 stored in the photo folder H can be output together through the flexible display 151.

In particular, the photos H1 to H3 stored in the photo folder H are displayed in turn on a bottom side of the flexible display 151, while a currently selected photo H2 can be displayed on a central part of the flexible display 151.

In doing so, referring to FIGS. 17(b) and 17(c), if a left corner of the flexible display 151 is bent, visual information is scrolled to a photo H3 next to a currently display photo H2 and the next photo H3 can be then displayed on the central part of the flexible display 151.

Alternatively, if a right corner of the flexible display 151 is bent, visual information is scrolled to a photo H1 previous to a currently display photo H2 and the previous photo H1 can be then displayed on the central part of the flexible display 151.

Referring to FIG. 18(a), if a left corner of the flexible display 151 is bent (B3), a menu item 235 situated at a left side of the flexible display 151 can be selected. The selected menu item is directly executed or can be executed in accordance with a selection or non-selection of an execution.

Similarly, referring to FIG. 18(b), if a right corner of the flexible display 151 is bent (B4), a menu item 237 situated at a right side of the flexible display 151 can be displayed. Moreover, a menu item 236 situated at a center of the flexible display 151 can be selected if a top or bottom side of the flexible display 151 is bent forward or backward.

Referring to FIG. 18(a), if a left corner of the flexible display 151 is bent (B3), a selected menu item 235 can be set in advance among menu items executable in accordance with a bending & drag input 240. Referring to FIG. 18(b), if a right corner of the flexible display 151 is bent for a bending & drag input (B4), a menu item 242 to be executed is set. Referring to FIG. 18(c), at least two menu items can be set if the flexible display 151 is bent (B5). In this instance, a message can be displayed to enable a user to select a menu item to execute.

Figure 19:
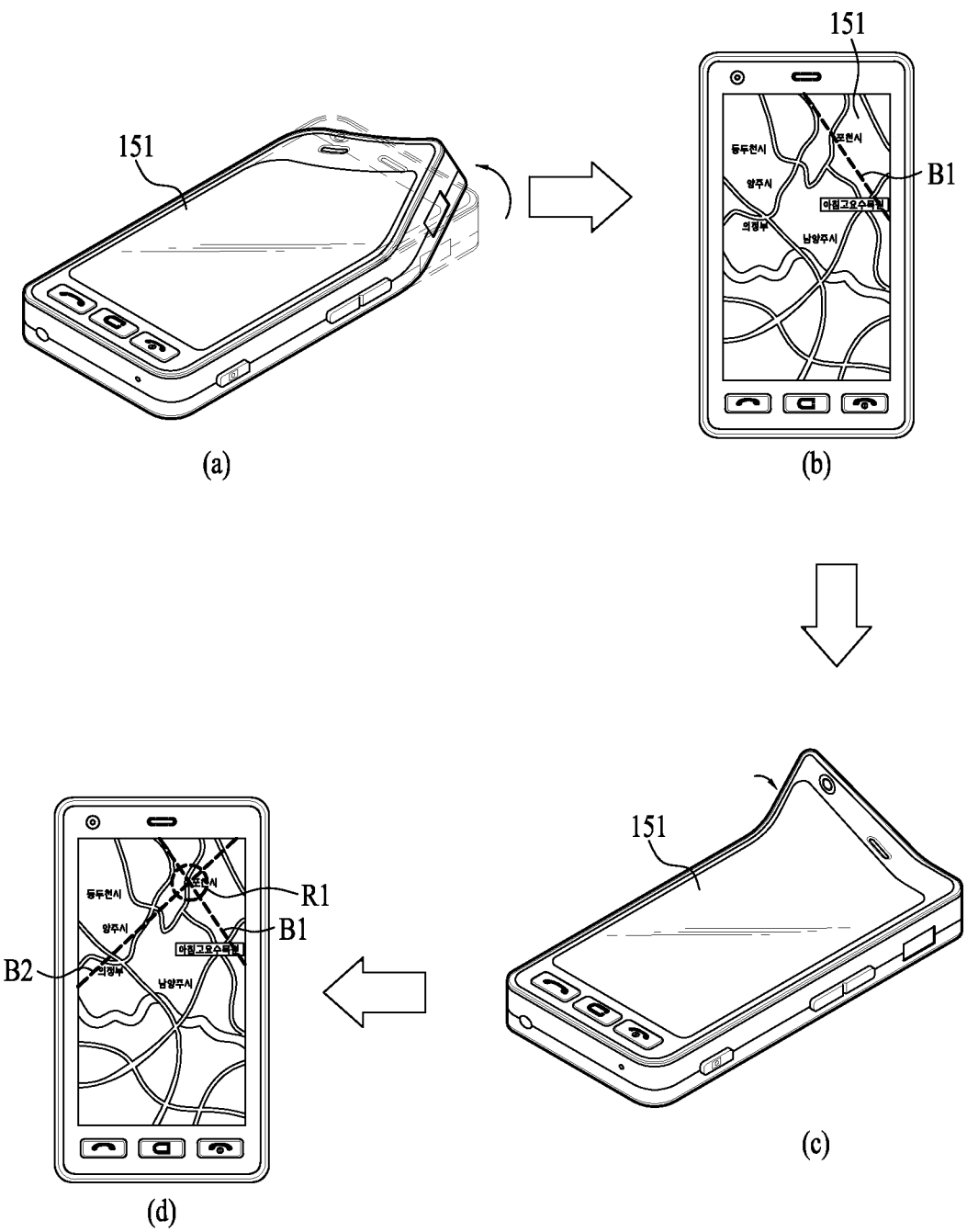
Figure 20:
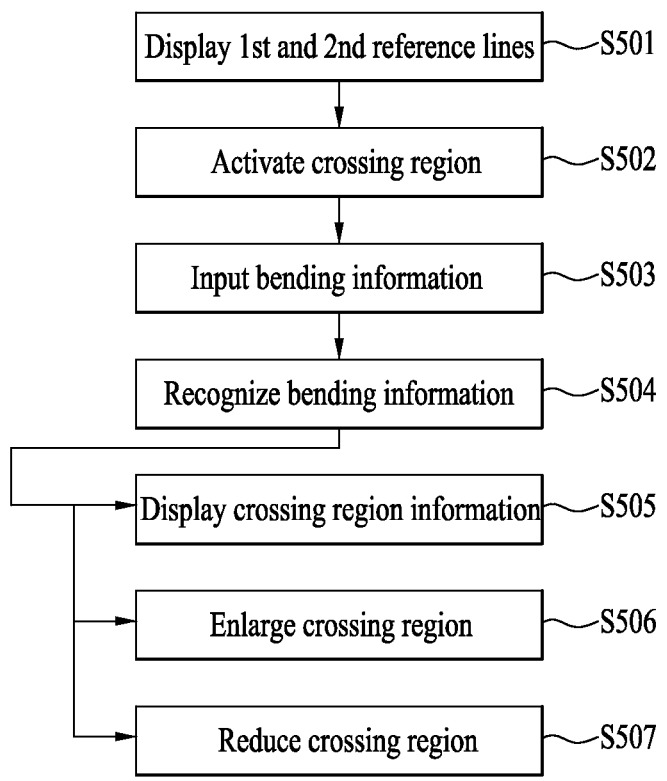

Referring to FIGS. 19 and 20, the controller 180 can output a crossing region R1 between the first reference line B1 and the second reference line B2 in a manner that the crossing line R1 overlaps with the visual information.

According to one embodiment, when the visual information is a map of a specific area, a user can select a specific region by bending the mobile terminal. In particular, the controller 180 displays the first reference line B1 and the second reference line B2 on existing visual information (S501) and activates the crossing region R1 between the first reference line B1 and the second reference line B2 (S502). Thereafter, if bending information or a touch is input (S503), the controller 180 recognizes the bending information (S504) and then displays information (i.e., region information) of the crossing region R1 (S505), enlarges the crossing region R1 (S506), or reduces the crossing region R1 (S507).

Figure 21:
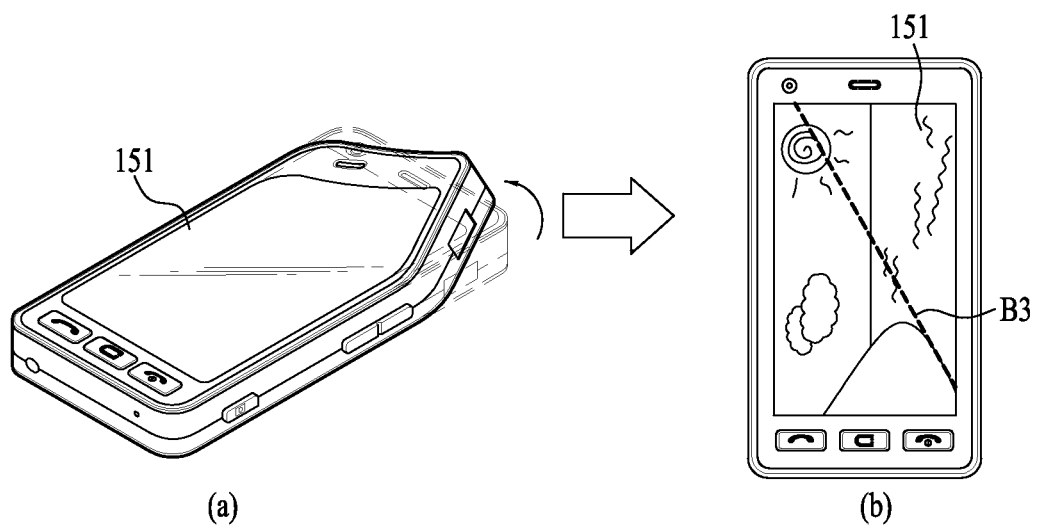
Figure 21:
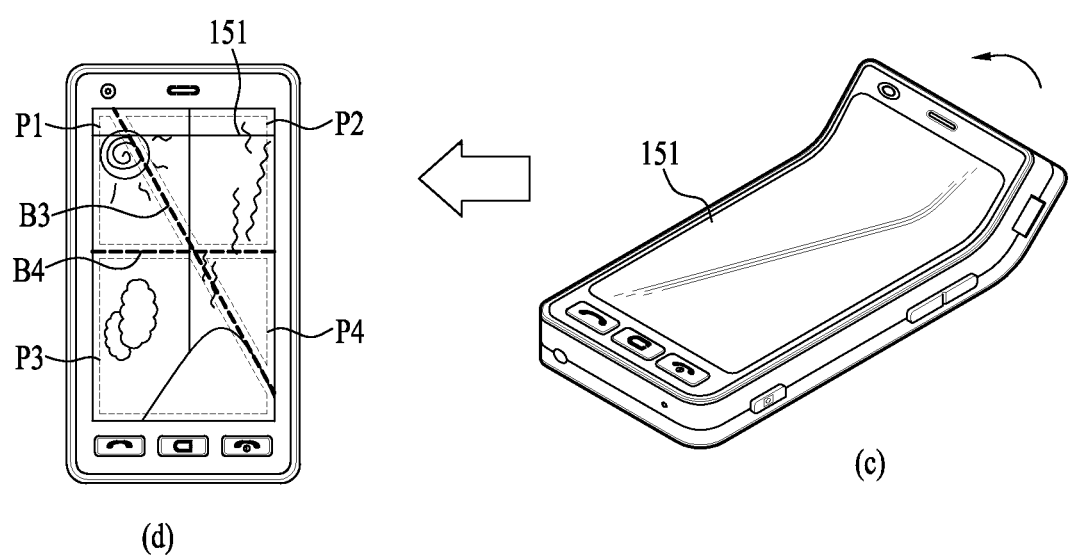

Alternatively, referring to FIG. 21, while visual information is output to the flexible display 151, the controller 180 outputs a first reference line B3 passing through a first curved portion by a first bending of the flexible display 151 and a second curved portion by a second bending of the flexible display 151 on the visual information and activates visual information P1 to P4 partitioned by the first and second reference lines, respectively.

For instance, if the visual information is a photo or a map, a user selects the partitioned visual information P1 to P4. The user can then edit the selected visual information by pasting, cutting or the like or transmit the partitioned visual information P1 to P4 via mail or the like.

Figure 22:
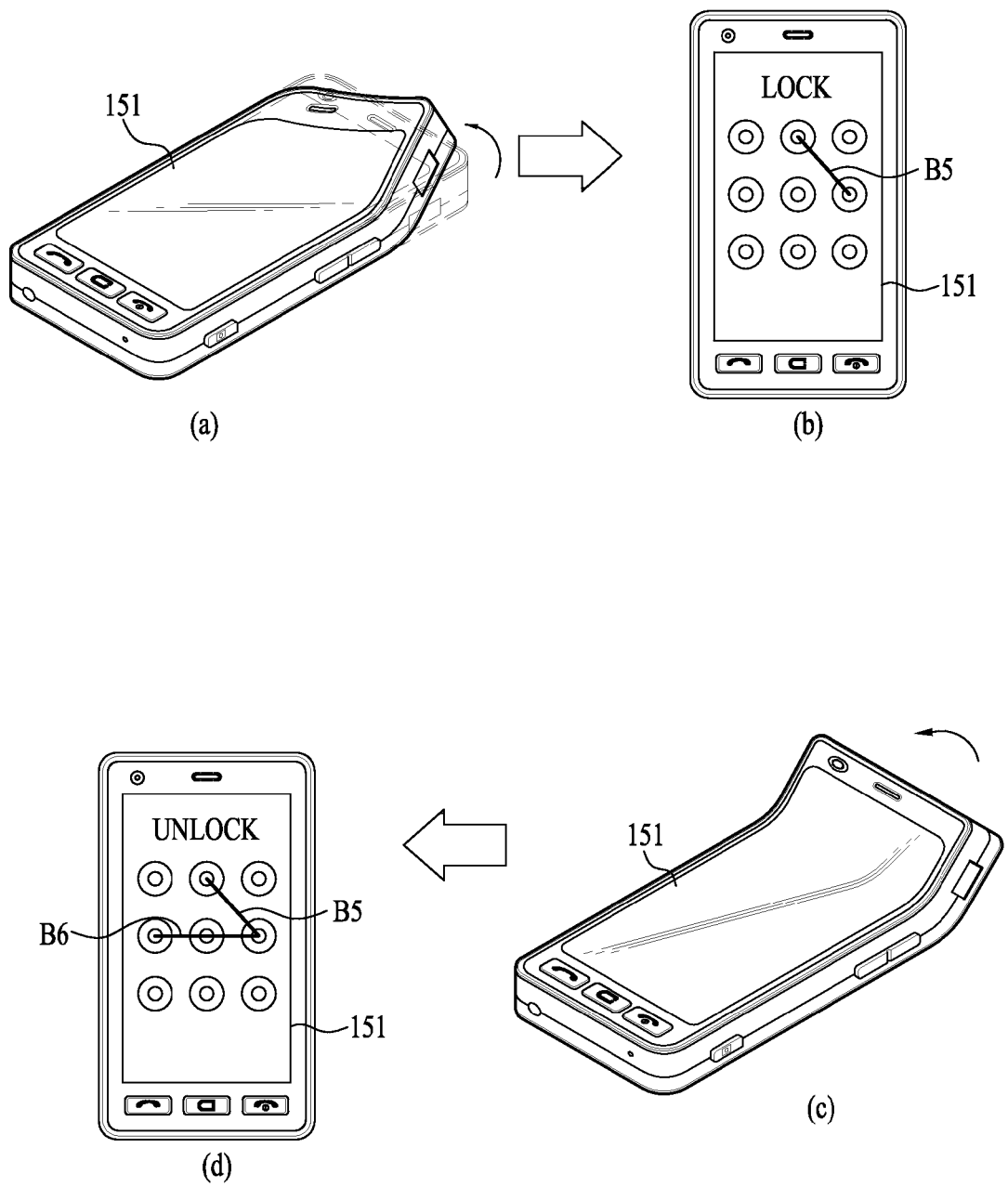

Referring to FIG. 22, if at least one reference line B5 or B6 passing through a corresponding curved portion attributed to at least one bending of the flexible display 151 matches a predetermined reference line, the controller 180 can unlock the flexible display 151.

In particular, a user can cancel a locked state of the flexible display 151 by letting a reference line, which is generated from bending the flexible display 151, pass through specific dots.

The activation and change of the mark by an input or change of a bending information has not yet been explained. However, a touch input for an activation and change of a mark can also be performed.

A mobile terminal according to another embodiment of the present invention includes the body 10 having at least one partial region formed of a flexible material, the flexible display 151 provided to the body 10 to output a specific visual information, the flexible display 151 configured to be bent by an elastic variation of the body 10, a sensor unit S configured to detect a bending information on at least one of a bent position, a bent count, a bent direction and a bent strength of the flexible display 151 and a touch input to the flexible display, and the controller 180 configured to output a prescribed mark M to a specific region of the flexible display 151 based on the bending information or the touch input by being distinguished from the rest region of the flexible display 151.

In this instance, if the bending information is recognized or changed or the touch input is recognized, the controller 180 can change at least one of a position, size, shape and color of a mark displayed on the flexible display 151.

In particular, a user can activate or change the mark by the touch input only. Alternatively, the user can activate or change the mark by combining the touch input and/or bending appropriately.

Moreover, if the bending information is recognized or changed or the touch input is recognized, the controller 180 can display visual information on a region overlapping with the mark or enlarge or reduce the visual information.

Namely, according to the above-described embodiments, the bending information is considered only or both of the bending information and the touch input can be taken into consideration.

The above-configured mobile terminal according to at least one of the embodiments of the present invention can generate various user input signals by physical variations of the flexible display. Further, the mobile terminal detects a pressure generated from bending the flexible display and converts the detected pressure into a user input signal.

Moreover, the mobile terminal according to at least one of the embodiments of the present invention detects a bent position, direction and strength of the flexible display and converts the detected information to a user input signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a body having at least one partial region including a flexible material;
a flexible display to display information;
a sensor unit to detect a first physical bending of the flexible display; and
a controller to display a prescribed mark to a specific region of the flexible display based on the detected first physical bending of the flexible display,
wherein when the sensor unit detects a second physical bending of the flexible display after the first physical bending is detected, the controller changes characteristics of the prescribed mark including at least one of a position, size, shape and color of the prescribed mark displayed on the flexible display based on at least one of a bent position of the flexible display, a number of times the flexible display is bent within a predetermined time period, a bent direction of the flexible display, and a bent strength of the bending of the flexible display.

2. The mobile terminal of claim 1, wherein the sensor unit outputs bending information to the controller based on the detected first physical bending of the flexible display, and
wherein the bending information includes on at least one of the bent position of the flexible display, the number of times the flexible display is bent within the predetermined time period, the bent direction of the flexible display, and the bent strength of the bending of the flexible display.

3. The mobile terminal of claim 1, wherein the displayed prescribed mark includes at least one of a dot, a line, a graphic, a symbol and an icon.

4. The mobile terminal of claim 1, wherein the controller displays a menu option on the flexible display allowing a user to set a type of the prescribed mark displayed on the flexible display in response to the output bending information, and to set what characteristics of the prescribed mark change based on the output bending information.

5. The mobile terminal of claim 2, wherein the controller further displays visual information overlapping with the prescribed mark or enlarges/reduces a size of the prescribed mark as the bending information changes in response to the physical bending of the flexible display.

6. The mobile terminal of claim 1, wherein the sensor unit includes a plurality of pressure sensors arranged on a backside of the flexible display in a length or width direction of the flexible display and being spaced apart from each other.

7. The mobile terminal of claim 6, wherein the controller determines a curved portion caused by a bending of the flexible display through a pressure detected by each of the pressure sensors and then displays a reference line passing through the curved portion as the prescribed mark on the flexible display.

8. The mobile terminal of claim 7, wherein the controller executes an application on the mobile terminal and displays application information on the flexible display corresponding to the executing application, and wherein when the displayed reference line is at a first position with respect to the application information, a second bending of the flexible display occurs at a second position with respect to the displayed application information so as to partially surround the displayed application information, and a touch input occurs on the displayed application or a third bending of the flexible display occurs, the controller activates the displayed application information.

9. The mobile terminal of claim 1, wherein the controller scrolls information displayed on the flexible display in response to an additional bending of the flexible display or a predetermined touching action on the flexible display.

10. The mobile terminal of claim 7, wherein the controller unlocks the mobile terminal when the displayed reference line matches a predetermined unlock reference line displayed on the flexible display.

11. The mobile terminal of claim 7, wherein the controller selects an item displayed on the flexible displayed based on an intersection of the reference line and another reference line displayed based on another bending of the flexible display.

12. A method of controlling a mobile terminal including a body having at least one partial region with a flexible material and a flexible display to display information, the method comprising:
detecting, via a sensor unit of the mobile terminal, a first physical bending of a flexible display; and
displaying, via a controller of the mobile terminal, a prescribed mark to a specific region of the flexible display based on the detected bending of the flexible display,
wherein when the detecting step detects a second physical bending of the flexible display after the first physical bending is detected, the method further comprises changing characteristics of the prescribed mark including at least one of a position, size, shape and color of the prescribed mark displayed on the flexible display based on at least one of a bent position of the flexible display, a number of times the flexible display is bent within a predetermined time period, a bent direction of the flexible display, and a bent strength of the bending of the flexible display.

13. The method of claim 12, wherein the sensor unit outputs bending information to the controller based on the detected first physical bending of the flexible display, and
wherein the bending information includes on at least one of the bent position of the flexible display, the number of times the flexible display is bent within the predetermined time period, the bent direction of the flexible display, and the bent strength of the bending of the flexible display.

14. The method of claim 12, wherein the displayed prescribed mark includes at least one of a dot, a line, a graphic, a symbol and an icon.

15. The method of claim 12, further comprising:
displaying a menu option on the flexible display allowing a user to set a type of the prescribed mark displayed on the flexible display in response to the output bending information, and to set what characteristics of the prescribed mark change based on the output bending information.

16. The method of claim 13, further comprising:
displaying visual information overlapping with the prescribed mark or enlarging/reducing a size of the prescribed mark as the bending information changes in response to the physical bending of the flexible display.

17. The method of claim 12, wherein the sensor unit includes a plurality of pressure sensors arranged on a backside of the flexible display in a length or width direction of the flexible display and being spaced apart from each other.

18. The method of claim 17, further comprising:
   determining, via the controller, a curved portion caused by a bending of the flexible display through a pressure detected by each of the pressure sensors and then displaying a reference line passing through the curved portion as the prescribed mark on the flexible display.

\* \* \* \* \*